(12) United States Patent
Vassieux et al.

(10) Patent No.: US 11,738,632 B2
(45) Date of Patent: Aug. 29, 2023

(54) HYBRID DRIVE SUB-ASSEMBLY FOR A VEHICLE

(71) Applicant: VALEO EMBRAYAGES, Amiens (FR)

(72) Inventors: Loic Vassieux, Cergy Pontoise (FR); Dominique Lheureux, Cergy Pontoise (FR)

(73) Assignee: VALEO EMBRAYAGES, Amiens (FR)

(*) Notice: Subject to any disclaimer, the term of this patent is extended or adjusted under 35 U.S.C. 154(b) by 0 days.

(21) Appl. No.: 17/651,982

(22) Filed: Feb. 22, 2022

(65) Prior Publication Data
US 2022/0266673 A1 Aug. 25, 2022

(30) Foreign Application Priority Data

Feb. 22, 2021 (FR) ..................................... 21 01671

(51) Int. Cl.
*B60K 6/442* (2007.10)
*B60K 6/36* (2007.10)
(Continued)

(52) U.S. Cl.
CPC .................. *B60K 6/36* (2013.01); *B60K 6/40* (2013.01); *B60K 6/442* (2013.01); *B60K 6/547* (2013.01);
(Continued)

(58) Field of Classification Search
CPC .. B60K 6/36; B60K 6/40; B60K 6/442; F16H 15/145; F16H 3/126; F16H 57/0006; F16H 2057/0012
(Continued)

(56) References Cited

U.S. PATENT DOCUMENTS

| 6,533,701 B2 * | 3/2003 | Maruyama | B60W 30/19 477/3 |
| 9,476,461 B2 * | 10/2016 | Genise | B60K 6/48 |

(Continued)

FOREIGN PATENT DOCUMENTS

| DE | 42 04 384 A1 | 8/1993 |
| DE | 10 2018 101 597 A1 | 7/2019 |

(Continued)

OTHER PUBLICATIONS

French Preliminary Search Report dated Aug. 19, 2021 in French Appliation 21 01671 filed on Feb. 22, 2021, 11 pages (with English Translation of Categories of Cited Documents & Written Opinion).

*Primary Examiner* — Ha Dinh Ho
(74) *Attorney, Agent, or Firm* — Oblon, McClelland, Maier & Neustadt, L.L.P.

(57) ABSTRACT

A hybrid drive sub-assembly for a vehicle has primary gear wheels, secondary gear wheels that are able to be coupled to a secondary shaft, and an intermediate shaft to which intermediate gear wheels are secured for rotation therewith. The primary gear wheel(s) and the secondary gear wheels each meshing permanently with a corresponding gear wheel from among the intermediate gear wheels. This hybrid sub-assembly is equipped with a motorized module having a reversible electric machine, an interface for connecting to the intermediate shaft, a speed reducer, a torsional oscillation damping device and a coupling mechanism that is able to couple and uncouple the reversible electric machine and the intermediate shaft.

20 Claims, 5 Drawing Sheets

(51) Int. Cl.
  *F16H 15/14* (2006.01)
  *F16H 3/12* (2006.01)
  *F16H 57/00* (2012.01)
  *B60K 6/40* (2007.10)
  *B60K 6/547* (2007.10)
  *F16D 3/12* (2006.01)
  *F16F 15/123* (2006.01)
  *F16F 15/14* (2006.01)

(52) U.S. Cl.
  CPC .............. *F16D 3/12* (2013.01); *F16F 15/123* (2013.01); *F16F 15/145* (2013.01); *F16H 3/126* (2013.01); *F16H 57/0006* (2013.01); *B60Y 2200/92* (2013.01); *F16F 2232/02* (2013.01); *F16F 2236/08* (2013.01); *F16H 2057/0012* (2013.01)

(58) Field of Classification Search
  USPC ........................................................ 74/665 B
  See application file for complete search history.

(56) References Cited

U.S. PATENT DOCUMENTS

| | | | |
|---|---|---|---|
| 2011/0198139 A1* | 8/2011 | Fuechtner | F16H 3/10 |
| | | | 903/902 |
| 2011/0212801 A1* | 9/2011 | Schrage | B60K 6/48 |
| | | | 475/5 |
| 2011/0290072 A1* | 12/2011 | Xie | B60K 6/547 |
| | | | 903/909 |
| 2011/0303048 A1 | 12/2011 | Genise | |
| 2015/0239334 A1 | 8/2015 | El Baraka et al. | |
| 2017/0210375 A1 | 7/2017 | Orlamuender | |

FOREIGN PATENT DOCUMENTS

| | | | |
|---|---|---|---|
| FR | | 3 090 783 A1 | 6/2020 |
| WO | WO 2014/049246 A1 | | 4/2014 |

* cited by examiner

HYBRID DRIVE SUB-ASSEMBLY FOR A VEHICLE

TECHNICAL FIELD OF THE INVENTION

The invention relates to a hybrid drive sub-assembly intended to be positioned between an engine, for example an internal combustion engine, and a set of one of more drive wheels of a vehicle. It relates in particular, although not exclusively, to such a sub-assembly intended to equip a heavy-duty vehicle, that is to say a road vehicle weighing more than 3.5 tonnes, in particular a tractor unit, or a truck. The invention also relates to a motorized module that is able to be integrated into the hybrid drive sub-assembly.

PRIOR ART

The document WO2011/072986A1 describes a hybrid drive sub-assembly for a vehicle, having a primary shaft intended to be driven by an internal combustion engine of the vehicle, a secondary shaft intended to drive a set of one or more drive wheels of the vehicle, and a transmission gearbox having a primary gear wheel that is secured to the primary shaft for rotation therewith or able to be coupled to the primary shaft, a plurality of secondary gear wheels that are secured to the secondary shaft for rotation therewith or able to be coupled to the secondary shaft, and two intermediate shafts to which intermediate gear wheels are secured for rotation therewith, the primary gear wheel and the secondary gear wheels each meshing with a corresponding gear wheel from among the intermediate gear wheels. The hybrid drive sub-assembly also has a reversible electric machine kinematically connected to the intermediate shafts via an upstream gear reduction stage and a dog coupling mechanism, said electric machine being able to operate as a current generator in order to brake the intermediate shafts or as a drive motor for the intermediate shafts. Such an electric machine makes it possible to envisage different operating modes, and in particular transient operation of the electric machine in order to brake or accelerate the intermediate shafts and promote the synchronization of the transmission gearbox in the phases of a change in transmission ratio, operation as a motor in order to assist the driving of the main engine of the vehicle outside the phases of a change in ratio, and operation as an electric generator in order to supply power to accessories of the vehicle or to a battery, in particular in braking phases of the vehicle. In this hybrid drive sub-assembly, the reversible electric machine is disposed in line with respect to the internal combustion engine, meaning that the rotor of the electric machine is concentric with the output of the intermediate shaft.

In the document WO2011/072986A1, the rotor of the electric machine is brought into connection with the intermediate shaft during the closure of a dog mechanism. Once the connection has been achieved, the acyclic behaviour that is generated by the crankshaft of the internal combustion engine and is present in the transmission gearbox is transmitted into the reversible electric machine, passing via the intermediate shaft. This acyclic behaviour and vibrations may disrupt the magnetic flow within the reversible electric machine or damage the guide bearings of the rotor.

It is therefore necessary to protect the reversible electric machine and optionally the associated speed reducer from the acyclic behaviour originating from the transmission gearbox.

SUMMARY OF THE INVENTION

The invention aims to overcome the drawbacks of the prior art and to provide better integration of an electric machine into a hybrid drive sub-assembly when it is coupled to an intermediate shaft of a transmission gearbox. This integration will also aim to improve the vibrational behaviour of this hybrid sub-assembly.

Provided to this end, according to a first aspect of the invention, is a motorized module for driving and decelerating an intermediate shaft of a hybrid sub-assembly having at least one primary gear wheel intended to be driven by a main engine of the vehicle, a secondary shaft intended to drive a set of one or more drive wheels of the vehicle, a plurality of secondary gear wheels that are able to be coupled to the secondary shaft, and intermediate gear wheels secured to the intermediate shaft for rotation therewith, the primary gear wheel(s) and the secondary gear wheels each meshing permanently with a corresponding gear wheel from among the intermediate gear wheels, the motorized module having at least one reversible electric machine that is able to drive and decelerate the intermediate shaft, a connecting interface that is able to be kinematically connected to the intermediate shaft in terms of rotation, a speed reducer disposed kinematically between the reversible electric machine and the connecting interface, wherein the motorized module comprises a torsional oscillation damping device disposed kinematically between the speed reducer and the connecting interface.

The use of a torsional oscillation damping device makes it possible to protect the reversible electric machine from the acyclic behaviour originating from the internal combustion engine and in particular passed on by the intermediate shaft.

Likewise, when the reversible electric machine is activated in drive mode, the transmission of generated vibrations from the reversible electric machine to the intermediate shaft is avoided. These vibrations may be significant when the electric machine is a high-power machine, with a power for example about 100 kW.

The integration of a motorized module into a hybrid sub-assembly makes it possible to envisage transient operation of the electric machine in order to brake or accelerate the intermediate shafts and promote the synchronization of the transmission gearbox in the phases of a change in transmission ratio, operation as a motor in order to assist the driving of the main engine of the vehicle outside the phases of a change in ratio, and operation as an electric generator in order to supply power to accessories of the vehicle or to a battery, in particular in braking phases of the vehicle.

Advantageously, the speed reducer may comprise a torque input member rotationally connected to the rotor of the reversible electric machine and a torque output member rotationally connected to the torsional oscillation damping device, said speed reducer being of the planetary gearset reducer type or of the parallel shafts reducer type or of the belt reducer type. In this way, the speed reducer makes it possible to adapt the rotational speed of the electric machine to the requirements of the hybrid sub-assembly.

Preferably, in the direction of transmission of driving torque from the reversible electric machine to the intermediate shaft, the torsional oscillation damping device may be disposed at the output of the speed reducer, that is to say after the speed reducer. In drive mode, the transmission of generated vibrations from the reversible electric machine to the intermediate shaft is avoided. In electric generator mode, the speed reducer is protected from the acyclic behaviour originating from the hybrid sub-assembly via the intermediate shaft.

Advantageously, the axis of the reversible electric machine may be concentric with the axis of rotation of the torsional oscillation damping device.

Preferably, the motorized module may have a coupling mechanism that is able to couple the motorized module to the intermediate shaft, said coupling mechanism being disposed kinematically between the torsional oscillation damping device and the connecting interface. In this way, the reversible electric machine can be uncoupled by simply actuating the coupling mechanism when said machine is not necessary for the operation of the transmission gearbox. An additional advantage is that the uncoupling of the reversible electric machine makes it possible to relieve the load on the guide bearings of the rotor of the electric machine, thereby increasing their service life.

Advantageously, the coupling mechanism may be of the dog mechanism type or of the synchronizer mechanism type or of the friction clutch mechanism type.

Preferably, the motorized module may have a module casing for housing the speed reducer and the torsional oscillation damping device, the reversible electric machine being either housed in the casing or fixed to the casing.

The reversible electric machine may in particular be a permanent-magnet synchronous machine, an asynchronous machine, a variable reluctance electric machine or what is known as a synchro-reluctance variable reluctance synchronous electric machine.

The reversible electric machine may have an axis of rotation parallel to an axis of rotation of the connecting interface, preferably at a distance from the axis of rotation of the connecting interface.

The connecting interface may be for example a splined section of shaft or a splined sleeve. It may also be a circular mounting plate with through-holes for fastening screws (the intermediate shaft comprising a bearing face provided with threaded holes), or a shaft provided with a key.

According to one embodiment of the invention, the torsional oscillation damping device may be of the helical springs damper type.

Preferably, the torsional oscillation damping device of the helical springs damper type may have:
 a torque transmission flange;
 two rotationally connected guide elements that are coaxial along an axis of rotation X and disposed on either side of said torque transmission flange;
 helical compression springs bearing on the torque transmission flange and the guide elements;
the torque transmission flange or one of the guide elements being rotationally connected to the output of the speed reducer.

Preferably, the torque transmission flange may be rotationally connected to the input disc carrier of the coupling mechanism of the friction clutch mechanism type.

In a variant, one of the guide elements may be rotationally connected to the input disc carrier of the coupling mechanism of the friction clutch mechanism type.

Advantageously, the torsional oscillation damping device of the helical springs damper type may comprise a hysteresis sub-assembly that is able to generate hysteresis torque in order to damp the torsional oscillations, having at least one friction washer and at least one elastic washer for applying load to the at least one friction washer.

Preferably, the torsional oscillation damping device of the helical springs damper type may comprise a direct angular actuation direction corresponding to activation of the reversible electric machine in drive mode and a reverse angular actuation direction corresponding to activation of the reversible electric machine in deceleration mode.

According to one of the possibilities of the invention, the hysteresis torque of the torsional oscillation damping device of the helical springs damper type in the direct angular actuation direction may be greater than the hysteresis torque in the reverse angular actuation direction. In this way, when the reversible electric machine is in drive mode, it is connected to the intermediate shaft in order to provide the latter with a complementary torque that will be subjected to the acyclic behaviour of the internal combustion engine. It is necessary to reduce this acyclic behaviour by means of a high hysteresis torque within the torsional oscillation damping device in the direct angular actuation direction. Since the internal combustion engine is in propulsion mode, it generates significant acyclic behaviour.

According to another of the possibilities of the invention, the hysteresis torque of the torsional oscillation damping device of the helical springs damper type in the direct angular actuation direction may be equal to the hysteresis torque in the reverse angular actuation direction.

According to yet another of the possibilities of the invention, the hysteresis torque of the torsional oscillation damping device of the helical springs damper type in the direct angular actuation direction may be less than the hysteresis torque in the reverse angular actuation direction. In this way, when the reversible electric machine is in deceleration mode, otherwise known as electric current generator mode, and the internal combustion engine is in propulsion mode, the acyclic behaviour originating from the internal combustion engine needs to be reduced by a high hysteresis torque within the torsional oscillation damping device in the reverse angular actuation direction. Since the internal combustion engine is in propulsion mode, it generates significant acyclic behaviour.

According to another embodiment of the invention, the torsional oscillation damping device may be of the pendulum mass damper type.

Preferably, the torsional oscillation damping device of the pendulum mass damper type may have a support that is rotatable about an axis X and at least one pendulum mass, the movement of which with respect to the support is guided by at least one rolling member, said support being rotationally connected to the torque output member of the speed reducer.

Advantageously, the support may be rotationally connected to the input disc carrier of the coupling mechanism of the friction clutch mechanism type.

According to another aspect, the invention relates to a hybrid drive sub-assembly for a vehicle, having:
 at least one primary gear wheel intended to be driven by a main engine of the vehicle,
 a secondary shaft intended to drive a set of one or more drive wheels of the vehicle,
 a plurality of secondary gear wheels that are able to be coupled to the secondary shaft,
 an intermediate shaft to which intermediate gear wheels are secured for rotation therewith, the primary gear wheel(s) and the secondary gear wheels each meshing permanently with a corresponding gear wheel from among the intermediate gear wheels,
 at least one motorized module having all or some of the abovementioned features, the connecting interface of the motorized module being secured to the intermediate shaft for rotation therewith.

Preferably, the hybrid sub-assembly has a transmission casing delimiting a cavity for housing the primary gear wheels, the secondary gear wheels and the intermediate gear wheels, the reversible electric machine being disposed outside the housing cavity.

Advantageously, the reversible electric machine has an axis of rotation parallel to an axis of rotation of the intermediate shaft, one or more of the following features being present:

- the axis of rotation of the reversible electric machine is at a distance from the axis of rotation of the intermediate shaft;
- the axis of rotation of the reversible electric machine is at a distance from an axis of rotation of the primary gear wheels;
- the axis of rotation of the reversible electric machine is at a distance from an axis of rotation of the secondary shaft.

Preferably, the hybrid sub-assembly may have a clutch that is controlled by a clutch actuator and able to uncouple the at least one primary gear wheel from the main engine of the vehicle, said clutch actuator being controlled by a control unit.

Advantageously, at least one dog clutch may be positioned kinematically between one of the secondary gear wheels and the secondary shaft and be able to couple the secondary shaft to the associated secondary gear wheel, said dog clutch being engaged when the rotational speeds of the secondary gear wheel and of the secondary shaft are synchronized by driving or decelerating the intermediate shaft by virtue of the activation of the reversible electric machine. In this way, it is possible to shorten the transient phases of a change in gear ratio within the hybrid sub-assembly. This adaptation of the speed of the intermediate shaft makes it possible to reduce the jaw clutching time, without resorting to a gearbox brake or double declutching.

According to another aspect, the invention relates to a method for engaging a dog clutch that is able to couple a secondary shaft to an associated secondary gear wheel within a hybrid sub-assembly having all or some of the abovementioned features, comprising the following steps:

- uncoupling the primary gear wheels from the main engine of the vehicle;
- putting the hybrid sub-assembly into a neutral position by disengaging the gear ratio;
- measuring the relative rotational speed between the secondary shaft and the associated secondary gear wheel;
- driving or decelerating the intermediate shaft by activating the reversible electric machine in order to synchronize the rotational speeds of the secondary shaft and of the associated secondary gear wheel;
- engaging the dog clutch in order to couple the secondary shaft to the associated secondary gear wheel when the rotational speeds of the secondary gear wheel and of the secondary shaft are synchronized.

According to this method for engaging a dog clutch, it is possible to shorten the transient phases of a change in gear ratio within the hybrid sub-assembly. This adaptation of the speed of the intermediate shaft makes it possible to reduce the jaw clutching time, without resorting to a gearbox brake or double declutching. Thus, when changing to a higher gear ratio, it is possible to decelerate the intermediate shaft of the hybrid sub-assembly by activating the reversible electric machine. Likewise, when changing to a lower gear ratio, it is possible to drive and accelerate the intermediate shaft of the hybrid sub-assembly by activating the reversible electric machine.

The invention will be understood better, and further aims, details, features and advantages thereof will become more clearly apparent from the following description of a particular embodiment of the invention, which is given solely by way of non-limiting illustration, with reference to the appended figures.

BRIEF DESCRIPTION OF THE FIGURES

Further features and advantages of the invention will become apparent from reading the following description, with reference to the appended figures.

For greater clarity, identical or similar elements are identified using identical reference signs in all of the figures.

DETAILED DESCRIPTION OF EMBODIMENTS

Figure 1:
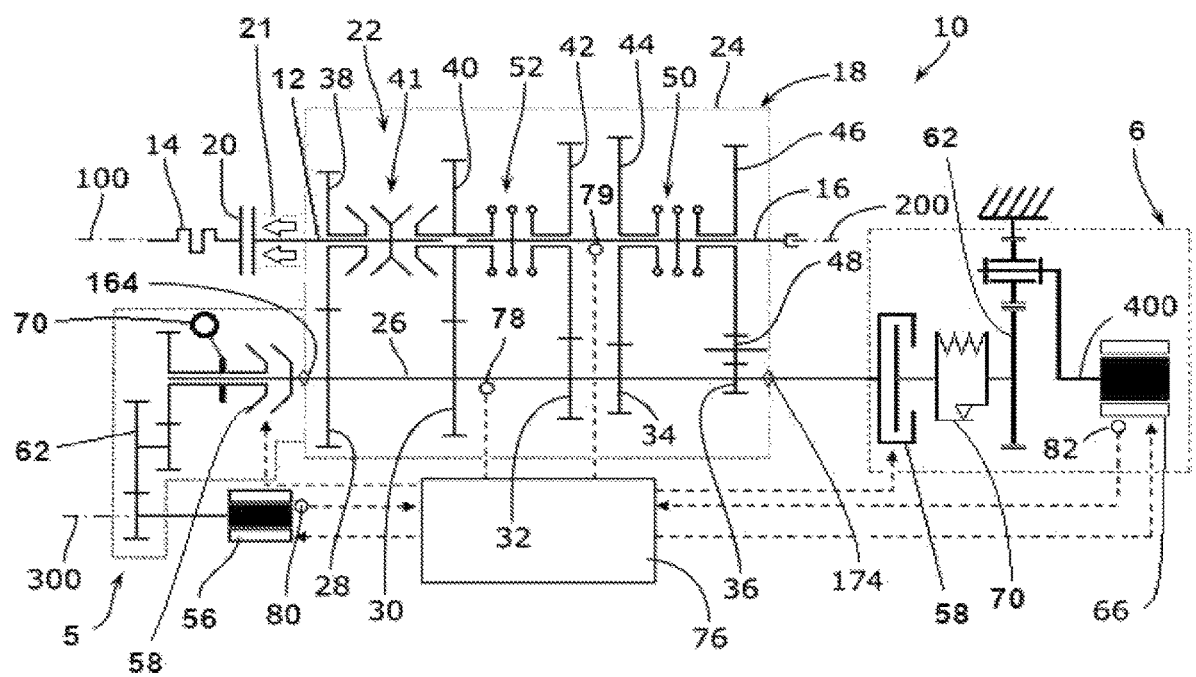
FIG. 1 illustrates a hybrid drive sub-assembly for a vehicle comprising two motorized modules according to a first embodiment of the invention.

FIG. 1 illustrates a hybrid drive sub-assembly 10 for a vehicle according to a first embodiment of the invention, having a primary shaft 12 intended to be driven by a main engine 14 of the vehicle, for example an internal combustion engine, a secondary shaft 16 intended to drive a set of one or more drive wheels of the vehicle (not illustrated), and a transmission gearbox 18.

The connection of the main engine 14 to the primary shaft 12 may include a clutch 20 of any appropriate type, for example a slip clutch. The clutch 20 is controlled by a clutch actuator 21 integrated into the transmission gearbox 18. The connection of the secondary shaft 16 to the wheels of the vehicle may include one or more drive axles.

The transmission gearbox 18, housed inside a cavity 22 of a transmission casing 24, has an intermediate shaft 26 to which intermediate gear wheels 28, 30, 32, 34, 36 are secured for rotation therewith. Two primary gear wheels 38, 40 that are coaxial with the primary shaft 12 each form a gear train with a corresponding gear wheel 28, 30, respectively, from among the intermediate gear wheels. The meshing of the gear trains 38, 28 and 40, 30 between the primary gear wheels 38, 40 and the corresponding intermediate gear wheels 28, 30 is permanent. A three-position dual synchronizer 41 allows one or the other of the primary gear wheels 38, 40 to be coupled to the primary shaft 12, and has a neutral position in which neither of the primary gear wheels 38, 40 is coupled to the primary shaft 12.

Secondary gear wheels 42, 44, 46 that are coaxial with the secondary shaft 16 likewise each form a gear train with a corresponding gear wheel 32, 34, 36, respectively, from among the intermediate gear wheels, one of the gear trains being a reversing gear train and having an intermediate gear wheel 48 for producing a reverse gear. The meshing of the gear trains formed by the secondary gear wheels 42, 44, 46 and the corresponding intermediate gear wheels 32, 34, 36 is permanent. A three-position dog coupling 50 without synchronizers, positioned between two of the secondary gear wheels 44, 46, makes it possible to either couple one or the other of the two associated secondary gear wheels 44, 46 to, or, in an intermediate neutral position, keep the associated secondary gear wheels 44, 46 uncoupled from the secondary shaft 16.

In this embodiment, the axis of revolution 100 of the primary shaft 12 is aligned with the axis of revolution 200 of the secondary shaft 16, thereby making it possible to use the end primary gear wheel 40 either as a primary gear wheel, associated with the primary shaft 12 by the synchronizer 41, or as a secondary gear wheel associated with the secondary shaft 16. To this end, a three-position dog coupling 52 without synchronizers, positioned between the end primary gear wheel 40 and the secondary gear wheel 42, makes it possible to couple to the secondary shaft 16 either the end primary gear wheel 40 or the secondary gear wheel 42, and also makes it possible, in an intermediate neutral position, to keep the end primary gear wheel 40 and the secondary gear wheel 42 uncoupled from the secondary shaft 16.

A transmission gearbox 18 with six forward gears and potentially two reverse gears can thus be obtained and can, if necessary, be coupled at the output of the secondary shaft 16 to a planetary gearset (not illustrated) in order to obtain a twelve-speed gearbox. However, this number of gear ratios is not limited.

Notably, the hybrid drive sub-assembly 10 is equipped with a motorized module 5 having a first reversible electric machine 56 for driving and decelerating the intermediate shaft 26, the rotor of which rotates about an axis of revolution 300. The motorized module 5 also has a connecting interface 164 kinematically connected in terms of rotation to the intermediate shaft, and a speed reducer 62 disposed kinematically between the reversible electric machine 56 and the connecting interface 164. The connecting interface 164 may for example be made up of a splined section of shaft or a splined sleeve fitted on the end of the intermediate shaft 26.

In order to protect the reversible electric machine 56 from the acyclic behaviour and vibrations originating from the intermediate shaft 26, the motorized module 5 comprises a torsional oscillation damping device 70 disposed kinematically between the speed reducer 62 and the connecting interface 164. The installation of the torsional oscillation damping device 70 between the speed reducer 62 and the connecting interface 164 also makes it possible to protect the gears of the speed reducer.

When the reversible electric machine 56 is activated in drive mode, the transmission of generated vibrations from the reversible electric machine to the intermediate shaft is avoided. These vibrations may be significant when the reversible electric machine is a high-power machine.

In the motorized module 5 shown in FIG. 1, the torsional oscillation damping device 70 is of the pendulum mass damper type.

The motorized module 5 also has a mechanism 58 for coupling the first reversible electric machine 56 to and uncoupling it from the intermediate shaft 26, said coupling mechanism 58 being disposed kinematically between the torsional oscillation damping device 70 and the connecting interface 164.

At least some of the elements of the motorized module 5 may be housed in a module casing 155, in particular the reduction gear train 62, the torsional oscillation damping device 70 and, if appropriate, the coupling and uncoupling mechanism 58. Alternatively, as illustrated in FIG. 1, the reversible electric machine 56 may be disposed outside the module casing 155, and if appropriate fixed to the module casing 155. The motorized module 5 may thus be produced in the form of a unitary module that is able to be integrated within the hybrid drive sub-assembly 10.

By way of illustration, a reversible electric machine 56 with a 48 volt power supply may be provided, with a reduction ratio between the output of the rotor of the electric machine and the coupling mechanism of between 4 and 6, depending on whether preference is to be given to high torque or a high rotational speed.

In this first embodiment, the hybrid drive sub-assembly 10 may also be equipped, optionally, with a second motorized module 6 having a second reversible electric machine 66 for driving and decelerating the intermediate shaft 26, the rotor of which rotates about an axis of revolution 400, and another mechanism 58 for coupling the second reversible electric machine 66 to and uncoupling it from the intermediate shaft 26.

The motorized module 6 also has a connecting interface 174 kinematically connected in terms of rotation to the intermediate shaft 26, and a speed reducer 62 of the planetary gearset reducer type disposed kinematically between the reversible electric machine 66 and the connecting interface 174. The connecting interface 164 may for example be made up of a splined section of shaft or a splined sleeve fitted on the end of the intermediate shaft 26.

In order to protect the second reversible electric machine 66 from the acyclic behaviour and vibrations originating from the intermediate shaft 26, the motorized module 6 also comprises a torsional oscillation damping device 70 disposed at the output of the planetary gearset. The torsional oscillation damping device 70 is kinematically connected to a torque output member, more particularly to the output sun shaft of the planetary gearset 62. The installation of the torsional oscillation damping device 70 between the speed reducer 62 and the connecting interface 174 makes it possible to protect the gears of the planetary gearset.

In the motorized module 6 shown in FIG. 1, the torsional oscillation damping device 70 is of the helical springs damper type 70a.

The second reversible electric machine 66 is used here to increase the electric power available for driving or decelerating the intermediate shaft 26, this making it possible, if appropriate, to use two electric machines 56, 66 of small dimensions having less radial bulk than a single electric machine of equivalent power.

The motorized modules 5, 6 are disposed preferably outside the main cavity 22 of the transmission gearbox casing 24, thereby making it possible to provide this sub-assembly as optional equipment on a conventional transmission gearbox. The axes of revolution 300, 400 of the two electric machines 56, 66 may, if appropriate, be aligned, and are preferably parallel to the axes of revolution 100, 200 of the primary shaft 12 and of the secondary shaft 16, which are parallel. The axis of revolution 300 of the electric machine 56 is at a distance from the axis of revolution of the intermediate shaft.

A control unit 76 makes it possible to control the first reversible electric machine 56 and its coupling and uncoupling mechanism 58, and, if appropriate, the second reversible electric machine 66 and its other coupling and uncoupling mechanism 58. Sensors 78, 79, 80, 82 for measuring the speed of revolution of the intermediate shaft 26 and for measuring a characteristic speed of revolution of each of the reversible electric machines 56, 66, which may be a speed of the output shaft of each reversible machine 56, 66 or a speed of revolution of an element of the associated reduction gear train 62, are connected to this control unit. This control unit 76 may be integrated into a robotic control of the transmission gearbox 18, which commands the opening and closing of the synchronizers 41, of the dog mechanisms 50, 52 and, if appropriate, of the main clutch 20 via the clutch actuator 21, in response to a torque or speed setpoint.

The first electric machine 56 and the optional second electric machine 66 make it possible to envisage several operating modes.

A first use relates to the transient phases of a change of gear ratio in the transmission gearbox 18. During these transient phases, one or the other of the two electric machines 56, 66, or both, make it possible to adapt the speed of revolution of the intermediate shaft to the synchronization requirements during the switching of the dog mechanisms 50, 52 or of the synchronizers 41, the electric machine(s) being able to be used either as an electric motor in order to increase the speed of revolution of the intermediate shaft 26 or as an electrodynamic brake in order to reduce this speed. This adaptation of the speed of the intermediate shaft 26 makes it possible to reduce the jaw clutching or synchronization time, without resorting to a gearbox brake or double declutching.

The transient phase of a change to a higher gear ratio will now be described in the context of a hybrid sub-assembly 10 comprising dog mechanisms 50, 52. The dog mechanisms, also known as dog clutches, 50, 52 are disposed between the secondary gear wheels 42, 44 and the secondary shaft 16. The clutch 20 of the transmission gearbox 18 is controlled by a robotic clutch actuator 21 in order to accelerate the changes in gear ratio. The clutch actuator 21 is controlled by the control unit 76.

Figure 5:
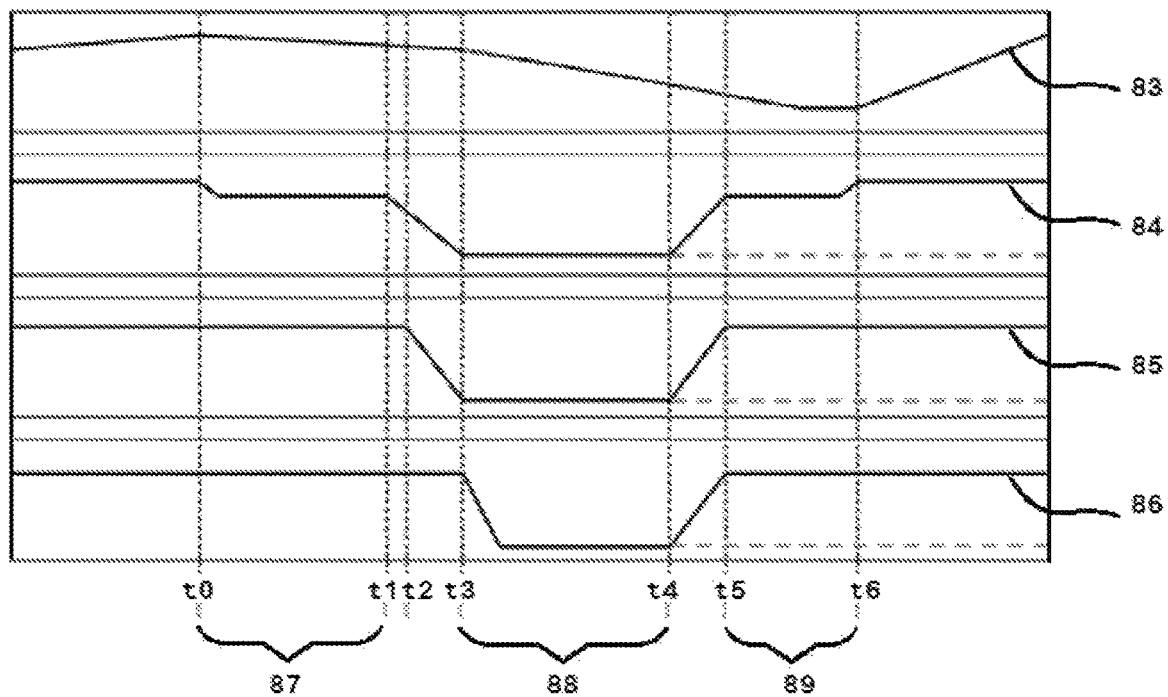
FIG. 5 illustrates the behaviour of the various members of the hybrid sub-assembly and of the vehicle during a transient phase of a change to a higher gear ratio.

FIG. 5 illustrates the behaviour of the various members of the hybrid sub-assembly and of the vehicle during this transient phase of a change to a higher gear ratio. In this figure, the curve 83 illustrates the rotational speed of the internal combustion engine 14, the curve 84 illustrates the open or closed state of the clutch 20, the curve 85 illustrates the neutral or in-mesh position of the transmission gearbox 18, the curve 86 illustrates the activation state of the reversible electric machine 56.

Furthermore, in this FIG. 5, a first phase 87 illustrates a phase of running of the vehicle between the times t0 and t1 in which the opening of the clutch 20 is started, complete opening being achieved at the time t3. Between t2 and t3, the transmission gearbox 18 passes from the in-mesh position to the neutral position, with the dog clutch 50 being disengaged. To prepare for the engagement of the dog clutch 52, the relative rotational speed between the secondary shaft 16 and the associated secondary gear wheel 42 is measured using the various speed sensors 78, 79. A second phase 88 illustrates a phase of running of the vehicle between t3 and t4, in which the reversible electric machine 56, 66 is activated to decelerate the intermediate shaft 26 of the hybrid sub-assembly. In this phase 88, the rotational speed of the intermediate shaft 26 is decelerated so as to synchronize the rotational speeds of the secondary gear wheel 42 and the secondary shaft 16. Between t4 and t5, the dog clutch 52 is engaged to couple the secondary shaft 16 to the associated secondary gear wheel 42 when their rotational speeds are synchronized. Likewise, between t4 and t5, the closure of the clutch 20 is started. A third phase 89 illustrates a phase of running of the vehicle between t5 and t6, in which the clutch 20 closes until the change to a higher gear ratio has been achieved.

By virtue of the reversible electric machine(s) 56, 66, it is possible to reduce the jaw clutching times without resorting to a gearbox brake. The intermediate shaft 26 is decelerated until the rotational speed of the secondary gear wheel 42 is synchronized with the rotational speed of the secondary shaft 16.

The transient phase of a change to a lower gear ratio will now be described in the context of a hybrid sub-assembly 10 according to the invention.

Figure 6:
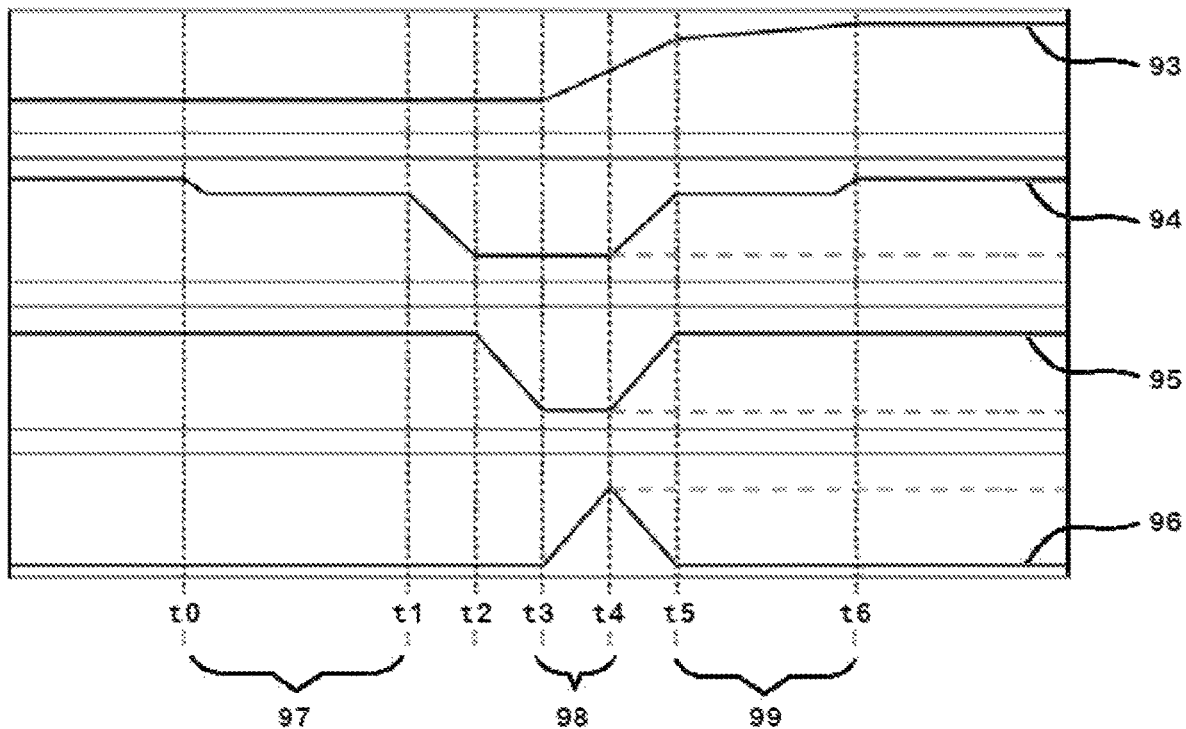
FIG. 6 illustrates the behaviour of the various members of the hybrid sub-assembly and of the vehicle during a transient phase of a change to a lower gear ratio.

FIG. 6 illustrates the behaviour of the various members of the hybrid sub-assembly and of the vehicle during this transient phase. In this figure, the curve 93 illustrates the rotational speed of the internal combustion engine 14, the curve 94 illustrates the open or closed state of the clutch 20, the curve 95 illustrates the neutral or in-mesh position of the transmission gearbox 18, the curve 96 illustrates the activation state of the reversible electric machine 56, 66.

Furthermore, in this FIG. 6, a first phase 97 illustrates a phase of running of the vehicle between the times t0 and t1 in which the opening of the clutch 20 is started, complete opening being achieved at the time t2. Between t2 and t3, the transmission gearbox 18 passes from the in-mesh position to the neutral position, with the dog clutch 52 being disengaged. To prepare for the engagement of the dog clutch 50, the relative rotational speed between the secondary shaft 16 and the associated secondary gear wheel 44 is measured using the various speed sensors 78, 79. A second phase 98 illustrates a phase of running of the vehicle between t3 and t4, in which the reversible electric machine 56 is activated to drive and accelerate the intermediate shaft 26 of the hybrid sub-assembly so as to synchronize the rotational speeds of the secondary gear wheel 44 and of the secondary shaft 16. Between t4 and t5, the dog clutch 50 is engaged to couple the secondary shaft 16 to the associated secondary gear wheel 44 when the rotational speeds of the secondary gear wheel and of the secondary shaft are synchronized. Likewise, between t4 and t5, the closure of the clutch 20 is started. A third phase 99 illustrates a phase of running of the vehicle between t5 and t6, in which the clutch 20 closes until the change to a lower gear ratio has been achieved.

By virtue of the reversible electric machine(s) 56, 66, it is possible to reduce the jaw clutching times without resorting to double declutching. The intermediate shaft 26 is driven and accelerated until the rotational speed of the secondary gear wheel 44 is synchronized with the rotational speed of the secondary shaft 16.

Outside the transient phases, when a gear ratio is engaged, the reversible electric machine(s) 56, 66 can be used as a current generator in order to charge a battery of the vehicle or in order to modulate the deceleration of the transmission drive train when the main internal combustion engine 14 of the vehicle enters an engine braking regime. Again when a gear ratio is engaged, the electric machine(s) 56, 66 powered by a battery of the vehicle can be used as a motor in order to provide additional power for the traction of the vehicle.

The use of the electric machines 56, 66 for purely electric traction of the vehicle may also be envisaged by opening the clutch 20 or the synchronizers 41 in order to uncouple the main engine 14 or the primary shaft 12, while keeping one of the dog mechanisms 50, 52 engaged.

The coupling and uncoupling mechanisms 58 are used to interrupt the connection between the intermediate shaft 26 and the electric machines 56, 66 when the latter are not useful, so as to limit the drag torque of the electric machines 56, 66 and reduce the fuel consumption.

Figure 2:
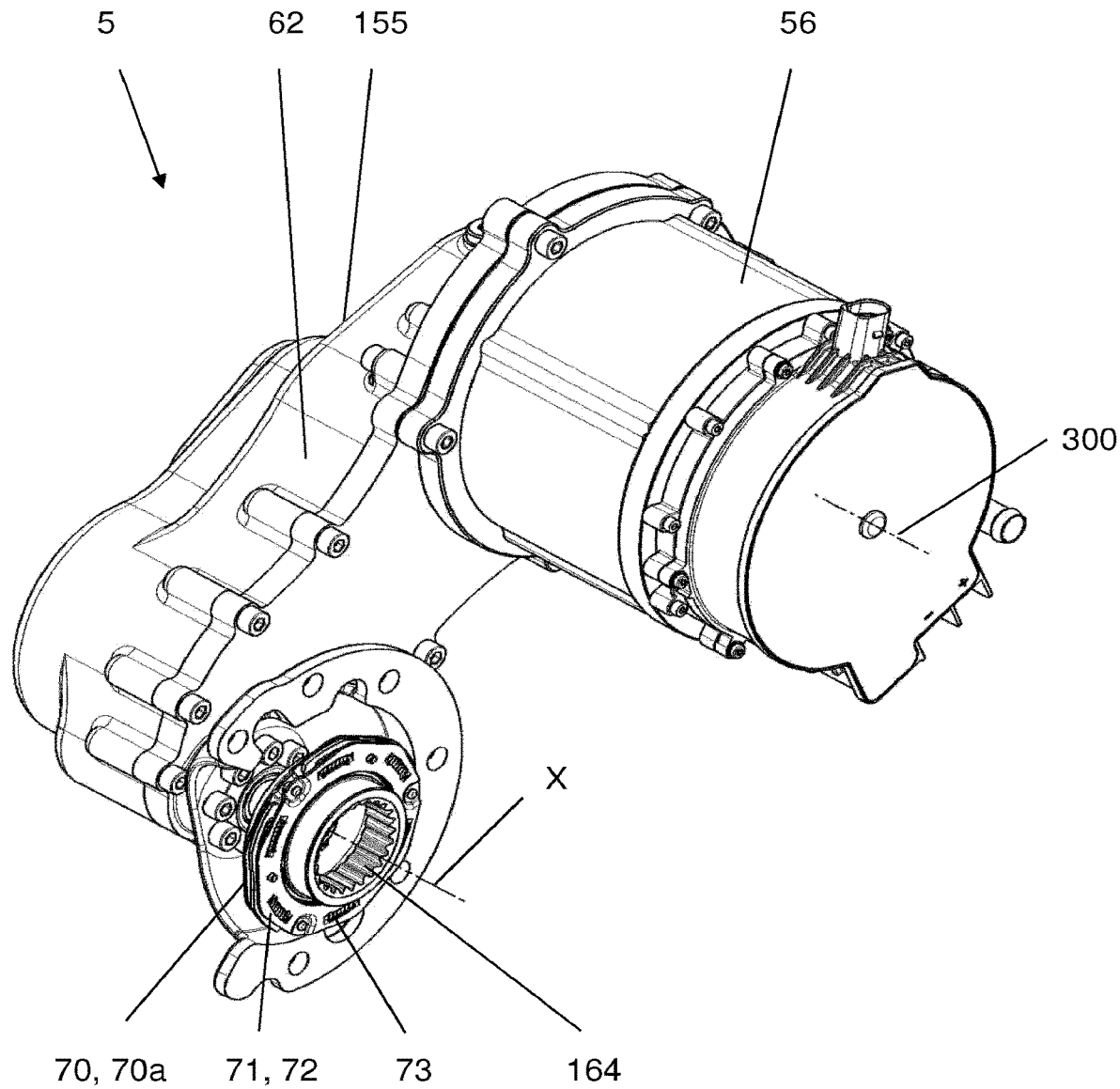
FIG. 2 is an isometric view of a motorized module for driving and decelerating an intermediate shaft of a hybrid sub-assembly according to a second embodiment of the invention.

FIG. 2 illustrates a second embodiment of the invention, in which the motorized module 5 has a module casing 155 for housing the speed reducer 62 and the torsional oscillation damping device 70. The reversible electric machine 56 is in this case fixed to the module casing 155. The reversible electric machine 56 has an axis of revolution parallel to the axis of revolution of the connecting interface 164 and at a distance from from the axis of revolution of the connecting interface 164.

The torsional oscillation damping device 70 of the helical springs damper type 70a has:
  a torque transmission flange 71;
  two rotationally connected guide elements 72 that are coaxial along an axis of rotation X and disposed on either side of said torque transmission flange 71;
  helical compression springs 73 bearing on the torque transmission flange 71 and the guide elements 72.

In this second embodiment, one of the guide elements 72 is rotationally connected to the output of the speed reducer 62 and the torque transmission flange 71 is directly connected to the intermediate shaft 26 by the connecting interface 164. The connecting interface 164 is a cylindrical hub provided with an interior spline.

Figure 3:
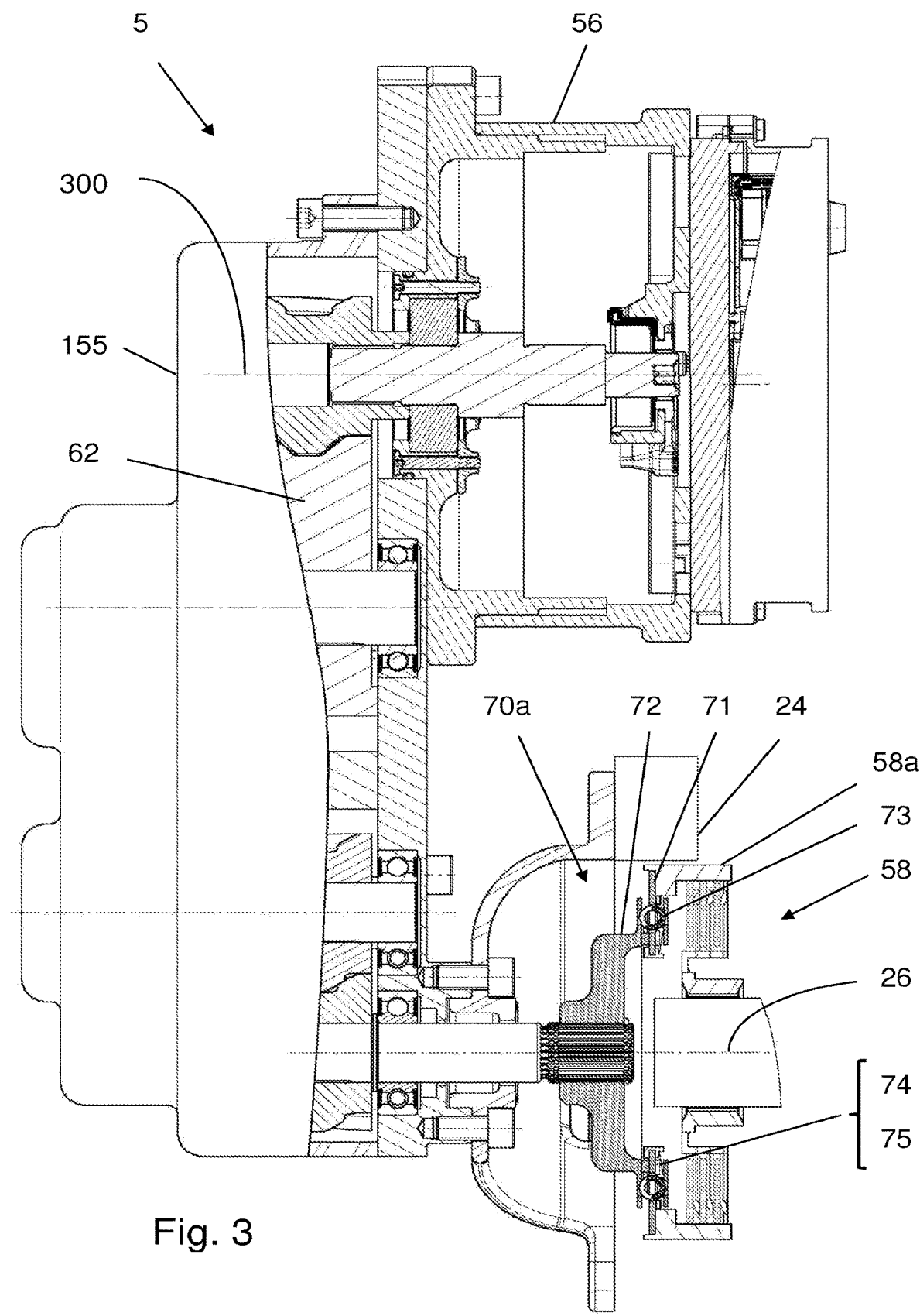
FIG. 3 is a cross-sectional view of the motorized module according to a third embodiment of the invention.

FIG. 3 illustrates a third embodiment of the invention, which differs from the above by the combination of the torsional oscillation damping device 70 of the helical springs damper type and a coupling and uncoupling mechanism 58 of the friction clutch mechanism type. The torque transmission flange 71 is rotationally connected to the input disc carrier 58a of the friction clutch mechanism 58.

In order to improve the filtering capacity of the motorized module 5, the torsional oscillation damping device 70 comprises a hysteresis sub-assembly that is able to generate a hysteresis torque in order to damp the torsional oscillations. The hysteresis sub-assembly has a friction washer 74 and an elastic washer 75 for applying load to the friction washer.

On account of its structure, the torsional oscillation damping device 70 of the helical springs damper type 70a comprises a first, direct angular actuation direction corresponding to activation of the reversible electric machine in drive mode, in which the helical compression springs 73 are compressed. The torsional oscillation damping device 70 comprises a second, reverse angular actuation direction corresponding to activation of the reversible electric machine in deceleration mode, in which the helical compression springs 73 are likewise compressed. The angular travels in the direct or reverse direction may be between 2 and 20 degrees. The angular travels in the direct or reverse direction may be different.

When the reversible electric machine 56 is in drive mode and the internal combustion engine in propulsion mode, it may be advantageous for the hysteresis torque of the torsional oscillation damping device of the helical springs damper type in the direct angular actuation direction to be greater than the hysteresis torque in the reverse angular actuation direction.

When the reversible electric machine 56 is in electric current generator mode and the internal combustion engine in propulsion mode, it may be advantageous for the hysteresis torque of the torsional oscillation damping device of the helical springs damper type in the direct angular actuation direction to be less than the hysteresis torque in the reverse angular actuation direction.

The acyclic behaviour originating from the internal combustion engine needs to be reduced by a high hysteresis torque within the torsional oscillation damping device. The value of the hysteresis torque depends in particular on the power of the reversible electric machine.

Figure 4:
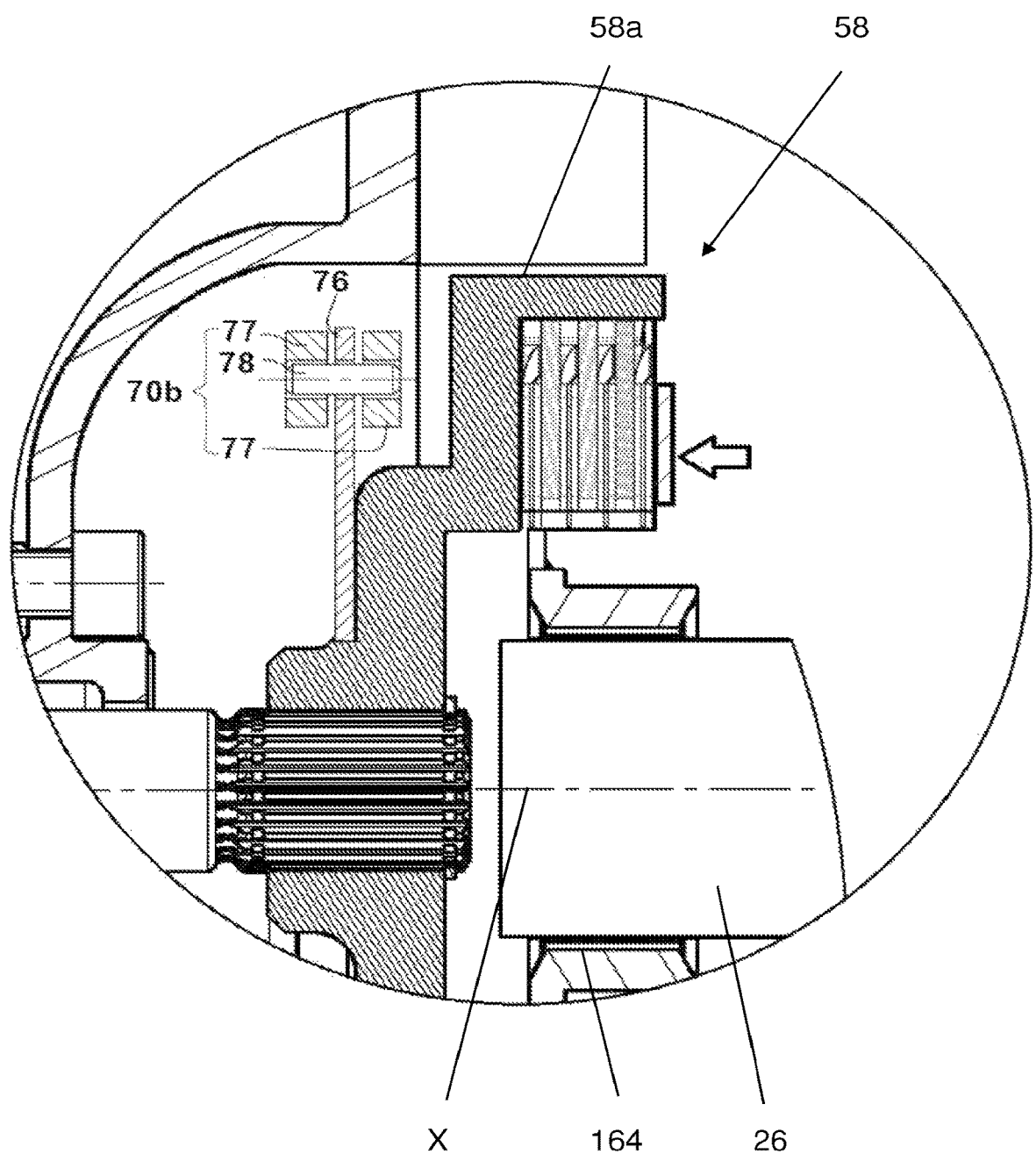
FIG. 4 is a cross-sectional detail view of a motorized module according to a fourth embodiment of the invention.

FIG. 4 illustrates a fourth embodiment of the invention, which differs from the third embodiment by the use of a torsional oscillation damping device of the pendulum mass damper type 70b. This pendulum mass damper 70b has a support 76 that is rotatable about an axis X and two pendulum masses 77, the movement of which with respect to the support is guided by rolling members 78. A plurality of pendulum masses 77 are distributed angularly about the axis X and oscillate about the movable support 76 depending on the acyclic behaviour originating from the intermediate shaft 26.

In response to the irregularities or acyclic rotational behaviour, each pendulum mass 77 moves such that its centre of gravity oscillates in a pendulum fashion. The oscillation frequency of each mass is proportional to the rotational speed of the intermediate shaft 26.

The structure of this pendulum mass damper 70b is notable in that the movable support 76 is rotationally connected to the torque output member of the speed reducer. In this example, the movable support 76 is fixed by being fitted on the input disc carrier 58a of the friction clutch mechanism 58.

The description given here of the transmission gearbox 18 is for illustration and is not intended to limit the scope of the teaching of the present application, which may apply to other configurations, with a larger or smaller number of gears, with dog or synchronizer couplings. The transmission gearbox may comprise for example a second intermediate shaft.

The invention claimed is:

1. A motorized module for driving and decelerating an intermediate shaft of a hybrid sub-assembly having at least one primary gear wheel to be driven by a main engine of the vehicle, a secondary shaft to drive a set of one or more drive wheels of the vehicle, a plurality of secondary gear wheels that are able to be coupled to the secondary shaft, and intermediate gear wheels secured to the intermediate shaft for rotation therewith, the primary gear wheel(s) and the secondary gear wheels each meshing permanently with a corresponding gear wheel from among the intermediate gear wheels, the motorized module having at least one reversible electric machine able to drive and decelerate the intermediate shaft, a connecting interface able to be kinematically connected to the intermediate shaft in terms of rotation, a speed reducer disposed kinematically between the reversible electric machine and the connecting interface, wherein the motorized module comprises a torsional oscillation damping device disposed kinematically between the speed reducer and the connecting interface.

2. The motorized module according to claim 1, wherein the speed reducer comprises a torque input member rotationally connected to a rotor of the reversible electric machine and a torque output member rotationally connected to the torsional oscillation damping device, wherein said speed reducer includes a planetary gearset reducer or a parallel shafts reducer or a belt reducer.

3. The motorized module according to claim 1, wherein the torsional oscillation damping device includes a helical springs damper or a pendulum mass damper.

4. The motorized module according to claim 3, wherein the torsional oscillation damping device includes:
  a torque transmission flange;
  two rotationally connected guide elements that are coaxial along an axis of rotation (X) and disposed on either side of said torque transmission flange;
  helical compression springs bearing on the torque transmission flange and the guide elements;

the torque transmission flange or one of the guide elements being rotationally connected to the output of the speed reducer.

5. The motorized module according to claim 4, wherein the torsional oscillation damping device comprises a hysteresis sub-assembly that is able to generate hysteresis torque in order to damp torsional oscillations, having at least one friction washer and at least one elastic washer for applying load to the at least one friction washer.

6. The motorized module according to claim 5, wherein the torsional oscillation damping device comprises a direct angular actuation direction corresponding to activation of the reversible electric machine in drive mode and a reverse angular actuation direction corresponding to activation of the reversible electric machine in deceleration mode.

7. The motorized module according to claim 6, wherein the hysteresis torque of the torsional oscillation damping device in the direct angular actuation direction is greater than or equal to or less than the hysteresis torque in the reverse angular actuation direction.

8. The motorized module according to claim 3, wherein the torsional oscillation damping device has a support that is rotatable about an axis (X) and at least one pendulum mass, wherein a movement of said at least one pendulum mass with respect to the support is guided by at least one rolling member, said support being rotationally connected to a torque output member of the speed reducer.

9. The motorized module according to claim 1, further comprising a coupling mechanism that is able to couple the motorized module to the intermediate shaft, said coupling mechanism being disposed kinematically between the torsional oscillation damping device and the connecting interface.

10. The motorized module according to claim 9, wherein the coupling mechanism comprises a dog mechanism or a synchronizer mechanism or a friction clutch mechanism.

11. The motorized module according to claim 1, further comprising a module casing for housing the speed reducer and the torsional oscillation damping device, the reversible electric machine being either housed in the casing or fixed to the casing.

12. A hybrid drive sub-assembly for a vehicle,
said hybrid drive sub-assembly comprising at least one motorized module according to claim 1, the connecting interface of the motorized module being secured to the intermediate shaft for rotation therewith.

13. The hybrid sub-assembly according to claim 12, wherein the reversible electric machine has an axis of rotation parallel to an axis of rotation of the intermediate shaft, one or more of the following features being present:
the axis of rotation of the reversible electric machine is at a distance from the axis of rotation of the intermediate shaft;
the axis of rotation of the reversible electric machine is at a distance from an axis of rotation of the primary gear wheels;
the axis of rotation of the reversible electric machine is at a distance from an axis of rotation of the secondary shaft.

14. The hybrid sub-assembly according to claim 12, further comprising at least one dog clutch that is positioned kinematically between one of the secondary gear wheels and the secondary shaft and is able to couple the secondary shaft to the associated secondary gear wheel, said dog clutch being engaged when rotational speeds of the secondary gear wheel and of the secondary shaft are synchronized by driving or decelerating the intermediate shaft by virtue of an activation of the reversible electric machine.

15. A method for engaging a dog clutch able to couple a secondary shaft to an associated secondary gear wheel within a hybrid sub-assembly according to claim 14, comprising the following steps:
uncoupling the primary gear wheels from the main engine of the vehicle;
putting the hybrid sub-assembly into a neutral position by disengaging thea gear ratio;
measuring a relative rotational speed between the secondary shaft and the associated secondary gear wheel;
driving or decelerating the intermediate shaft by activating the reversible electric machine in order to synchronize rotational speeds of the secondary shaft and of the associated secondary gear wheel;
engaging the dog clutch in order to couple the secondary shaft to the associated secondary gear wheel when the rotational speeds of the secondary gear wheel and of the secondary shaft are synchronized.

16. The motorized module according to claim 2, wherein the torsional oscillation damping device comprises a helical springs damper or a pendulum mass damper.

17. The motorized module according to claim 2, further comprising a coupling mechanism that is able to couple the motorized module to the intermediate shaft, said coupling mechanism being disposed kinematically between the torsional oscillation damping device and the connecting interface.

18. The motorized module according to claim 2, further comprising a module casing for housing the speed reducer and the torsional oscillation damping device, the reversible electric machine being either housed in the casing or fixed to the casing.

19. A hybrid drive sub-assembly for a vehicle, said hybrid drive sub-assembly comprising at least one motorized module according to claim 2, the connecting interface of the motorized module being secured to the intermediate shaft for rotation therewith.

20. The hybrid sub-assembly according to claim 13, further comprising at least one dog clutch that is positioned kinematically between one of the secondary gear wheels and the secondary shaft and is able to couple the secondary shaft to the associated secondary gear wheel, said dog clutch being engaged when rotational speeds of the secondary gear wheel and of the secondary shaft are synchronized by driving or decelerating the intermediate shaft by virtue of an activation of the reversible electric machine.

* * * * *